(12) United States Patent
Li et al.

(10) Patent No.: US 12,437,099 B2
(45) Date of Patent: Oct. 7, 2025

(54) ACCESS LIMITING METHOD, APPARATUS AND DEVICE FOR METADATA SERVER

(71) Applicant: Beijing Volcano Engine Technology Co., Ltd., Beijing (CN)

(72) Inventors: Mengjun Li, Beijing (CN); Qing Xu, Beijing (CN); Ke Sun, Beijing (CN); Jun Guo, Beijing (CN); Xuan Luo, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/812,238

(22) Filed: Aug. 22, 2024

(65) Prior Publication Data
US 2025/0068757 A1 Feb. 27, 2025

(30) Foreign Application Priority Data
Aug. 23, 2023 (CN) .......................... 202311069872.9

(51) Int. Cl.
*G06F 21/62* (2013.01)
(52) U.S. Cl.
CPC ................................ *G06F 21/6218* (2013.01)
(58) Field of Classification Search
CPC .................................................. G06F 21/6218
See application file for complete search history.

(56) References Cited

U.S. PATENT DOCUMENTS

| | | | | |
|---|---|---|---|---|
| 8,407,228 B1* | 3/2013 | Hahn | ..................... | G06F 16/282 707/745 |
| 9,898,614 B1* | 2/2018 | Muniswamy Reddy | ..................... | G06F 16/2228 |
| 10,108,690 B1* | 10/2018 | Murray | ................. | G06F 16/278 |
| 10,528,599 B1* | 1/2020 | Pandis | ................. | G06F 16/2455 |
| 10,769,148 B1* | 9/2020 | Binkert | ............... | G06F 16/24542 |
| 11,074,261 B1* | 7/2021 | Pandis | ................. | G06F 16/9535 |
| 11,436,211 B1* | 9/2022 | Perianayagam | ...... | G06F 16/252 |

(Continued)

FOREIGN PATENT DOCUMENTS

| | | |
|---|---|---|
| CN | 111447150 A | 7/2020 |
| CN | 113098793 A | 7/2021 |

(Continued)

OTHER PUBLICATIONS

Tu, Y. et al., "Research and optimization on quality of service in distributed block storage system," Telecommunications Science, vol. 34, Issue 4, Apr. 20, 2018, 11 pages. Submitted with English abstract.

*Primary Examiner* — Jason Chiang
(74) *Attorney, Agent, or Firm* — Alleman Hall & Tuttle LLP

(57) ABSTRACT

The present application discloses an access limiting method for a metadata server, an apparatus and a device, wherein the method is applied to a data lake metadata server, receives a metadata access request sent by a client, wherein the request is used for obtaining metadata stored by a storage server for describing target data, and the target data is data in a target table. The metadata service interface used by the data lake metadata server is determined according to the metadata access request. When the metadata service interface satisfies the preset condition, determining the number of applied tokens corresponding to the metadata access request according to the number of table partitions and the number of partition levels of the obtained target table.

17 Claims, 4 Drawing Sheets

(56) References Cited

U.S. PATENT DOCUMENTS

| | | | |
|---|---|---|---|
| 11,616,634 B1* | 3/2023 | Naim | H03M 13/255 |
| | | | 375/131 |
| 11,899,685 B1* | 2/2024 | Pandis | G06F 16/27 |
| 11,947,555 B1* | 4/2024 | Mohideen | G06F 16/2471 |
| 12,050,609 B1* | 7/2024 | Gao | G06F 16/24578 |
| 12,061,708 B1* | 8/2024 | Mritunjai | G06F 3/0638 |
| 12,105,692 B1* | 10/2024 | Kumar | G06F 16/256 |
| 2011/0153606 A1* | 6/2011 | Kim | G06F 16/1827 |
| | | | 707/E17.089 |
| 2013/0159659 A1* | 6/2013 | Gelman | G06F 16/278 |
| | | | 711/E12.001 |
| 2013/0250802 A1* | 9/2013 | Yalagandula | H04L 41/12 |
| | | | 370/254 |
| 2013/0346820 A1* | 12/2013 | Jeddeloh | G01R 31/3187 |
| | | | 714/738 |
| 2014/0007250 A1* | 1/2014 | Stefanov | G06F 21/60 |
| | | | 726/26 |
| 2014/0380330 A1* | 12/2014 | Xiao | G06F 9/5016 |
| | | | 718/104 |
| 2015/0149509 A1* | 5/2015 | Leu | G06F 16/27 |
| | | | 707/803 |
| 2015/0149513 A1* | 5/2015 | Beigel | G06F 16/2282 |
| | | | 707/809 |
| 2016/0162406 A1* | 6/2016 | Latorre | G06F 12/0811 |
| | | | 711/122 |
| 2016/0162557 A1* | 6/2016 | DelGobbo | G06F 16/242 |
| | | | 707/626 |
| 2017/0185304 A1* | 6/2017 | Curtis-Maury | G06F 3/067 |
| 2017/0317932 A1* | 11/2017 | Paramasivam | G06F 9/5083 |
| 2019/0325051 A1 | 10/2019 | George | |
| 2021/0089540 A1* | 3/2021 | Karl | G06F 16/24552 |
| 2021/0165805 A1* | 6/2021 | Xie | G06F 16/278 |
| 2021/0191886 A1* | 6/2021 | Jacob | G06F 9/466 |
| 2021/0255792 A1* | 8/2021 | Jaiyeoba | G06F 3/067 |
| 2021/0360065 A1 | 11/2021 | Liu | |
| 2022/0207014 A1* | 6/2022 | Watzke | G06F 16/24556 |
| 2022/0253419 A1* | 8/2022 | Karlberg | G06F 16/185 |
| 2022/0269417 A1* | 8/2022 | Sanvido | G06F 3/0608 |
| 2022/0309112 A1* | 9/2022 | Qu | G06F 16/137 |
| 2023/0125030 A1* | 4/2023 | Darji | G06F 9/44505 |
| | | | 713/100 |
| 2023/0195806 A1* | 6/2023 | Bhashyam | G06F 16/2358 |
| | | | 707/709 |
| 2023/0237017 A1* | 7/2023 | Jiang | G06F 16/134 |
| | | | 707/827 |
| 2023/0237705 A1* | 7/2023 | Wan | G06T 9/40 |
| | | | 382/232 |
| 2023/0376475 A1* | 11/2023 | Wu | G06F 16/22 |
| 2024/0036917 A1* | 2/2024 | Long | G06F 9/3887 |
| 2024/0054163 A1* | 2/2024 | Geng | G06F 16/245 |

FOREIGN PATENT DOCUMENTS

| | | |
|---|---|---|
| CN | 113761294 A | 12/2021 |
| CN | 115190078 A | 10/2022 |

* cited by examiner

ACCESS LIMITING METHOD, APPARATUS AND DEVICE FOR METADATA SERVER

CROSS-REFERENCE TO RELATED APPLICATION(S)

This application claims priority to Chinese Application No. 202311069872.9 filed on Aug. 23, 2023, the disclosure of which is incorporated herein by reference in its entirety.

FIELD

The present application relates to the technical field of computers, in particular to an access limiting method, an apparatus, and a device for a metadata server.

BACKGROUND

With the development of Internet technology, the amount of data stored for big data is increasing. In order to mine as much value from massive data as possible, data analysis tasks are becoming more and more complex, which challenges the stability of big data services.

Data lake metadata services are widely used as online big data services in big data scenarios, such as Hive metadata services. The Data Lake metadata service can be used to fetch metadata. When the data analysis task is relatively complex, multiple accesses to the data lake metadata service are usually initiated. At this time, the load pressure of metadata storage is large.

Based on this, an access limiting method is urgently needed to effectively restrict some accesses, so as to improve the stability of data lake metadata services and reduce the load pressure of metadata storage.

SUMMARY

In view of the above, the present application provides an access limiting method for a metadata server, an apparatus, and a device, which are used for performing limiting processing on a metadata access request of a data lake metadata server that provides a metadata service.

In order to solve the above problems, the technical solutions provided by the present application are as follows:

According to a first aspect, the present application provides an access limiting method for a metadata server, wherein the method is applied to a data lake metadata server, and comprises:
 receiving a metadata access request sent by a client, the metadata access request being used for obtaining metadata stored by a storage server for describing target data; the target data being data in a target table;
 determining a metadata service interface used by the data lake metadata server according to the metadata access request;
 when the metadata service interface satisfies a preset condition, obtaining request parameters of the metadata access request; the request parameters include a number of table partitions and a number of partition levels of the target table;
 obtaining a number of applied tokens corresponding to the metadata access request according to the number of table partitions and the number of partition levels;
 when the number of applied tokens is greater than the number of remaining tokens corresponding to the client, performing limiting processing on the metadata access request.

According to a second aspect, the present application provides an access limiting apparatus for a metadata server, wherein the device is applied to a data lake metadata server, and comprises:
 a receiving unit configured to receive a metadata access request sent by a client, wherein the metadata access request is used for obtaining metadata stored by a storage server for describing target data; the target data being data in a target table;
 a first determining unit configured to determine a metadata service interface used by the data lake metadata server according to the metadata access request;
 a first obtaining unit configured to obtain request parameters of the metadata access request when the metadata service interface satisfies a preset condition; the request parameters include a number of table partitions and a number of partition levels of the target table;
 a second obtaining unit configured to obtain a number of applied tokens corresponding to the metadata access request according to the number of table partitions and the number of partition levels;
 a processing unit configured to perform limiting processing on the metadata access request when the number of applied tokens is greater than the number of remaining tokens corresponding to the client.

In a third aspect, the present application provides an electronic device, comprising:
 one or more processors;
 a storage having one or more programs stored thereon, wherein the one or more programs when executed by the one or more processors, cause the one or more processors to implement any of the access limiting method for metadata servers.

According to a fourth aspect, the present application provides a computer-readable storage medium having stored thereon a computer program that, when executed by a processor, implements any of the access limiting method for the metadata servers described above.

It can be seen that the present application has the following beneficial effects:
 the present application provides an access limiting method, an apparatus and an apparatus of a metadata server, and the method is applied to a data lake metadata server that provides metadata services. The data lake metadata server receives a metadata access request sent by the client, and the request is used for obtaining metadata stored by the storage server for describing target data, and the target data is data in a target table. After receiving the access request, the limiting processing flow of the metadata access request is started. Specifically, the metadata service interface used by the data lake metadata server is first determined according to the obtained metadata access request. When the metadata service interface meets the preset condition, request parameters of the metadata access request are obtained, that is, the number of table partitions and the number of partition levels of the target table. The number of table partitions and the number of partition levels of the target table are used to realize the limiting processing determination of the metadata access request. That is, first, the number of applied tokens corresponding to the metadata access request is determined according to the number of table partitions and the number of partition levels of the target table. When the number of applied tokens corresponding to the metadata access request is larger than the number of remaining tokens corresponding to the client, limiting processing is performed on the metadata access request.

It can be seen that request parameters corresponding to different tables or the same table at different times in the requests received by the metadata service interface satisfying the preset conditions may be different, and the corresponding number of applied tokens may be different. Therefore, the present application can adaptively determine the number of applied tokens corresponding to the metadata access request through the metadata service interface and the request parameters of the metadata access request, and determine whether to perform limiting processing on the metadata access request based on the number of applied tokens. In this way, the service stability of the data lake metadata server can be improved, and the load pressure of the storage server can be reduced.

DETAILED DESCRIPTION OF EMBODIMENTS

Figure 1:
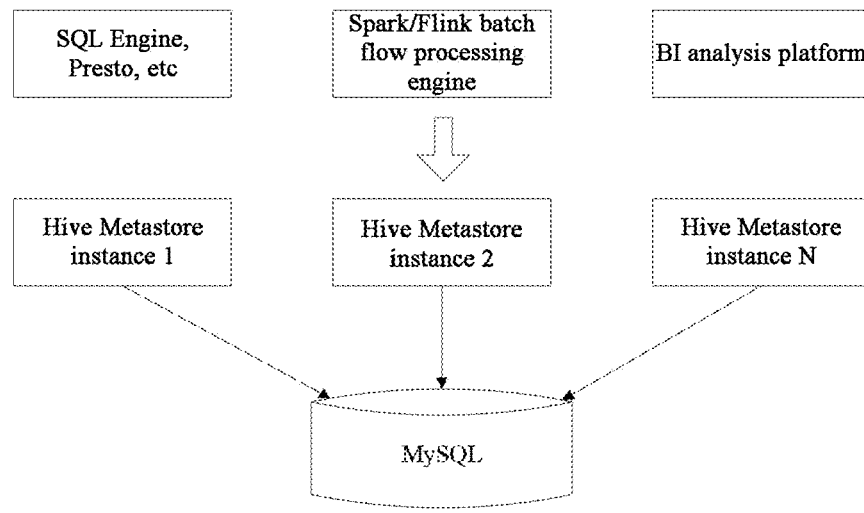
FIG. 1 is a schematic diagram of an application scenario provided by an embodiment of the present application.

In order to make the above objects, features and advantages of the present application more obvious and easily understood, embodiments of the present application will be described in further detail below with reference to the accompanying drawings and the detailed description.

In order to facilitate understanding and explanation of the technical solutions provided by the embodiments of the present application, the background art of the present application will be described below.

It can be understood that before using the technical solution of each embodiment of the present disclosure, the user is notified of the type, usage scope, usage scenario, and the like of the related personal information in an appropriate manner, and the authorization of the user is obtained.

For example, in response to receiving an active request from the user, a prompt message is sent to the user to explicitly prompt the user that the operation requested to be performed will require the obtaining and use of the user's personal information. Accordingly, the user can independently select whether or not to provide personal information to software or hardware such as an electronic device, an application program, a server, or a storage medium that performs the operation of the present invention according to the prompt information.

As an optional but non-limiting implementation, in response to receiving an active request from the user, the way of sending prompt information to the user may be, for example, a pop-up window, and the prompt information may be presented in a text manner in the pop-up window. In addition, the pop-up window can also carry a selection control for the user to choose "agree" or "disagree" to provide personal information to the electronic device.

It is to be understood that the above-described procedures of notifying and obtaining user authorization are merely illustrative and do not limit the implementation forms of the present disclosure, and other methods satisfying relevant laws and regulations may also be applied to the implementation forms of the present disclosure.

With the development of Internet technology, the amount of data stored for big data lakes is increasing. In order to mine as much valuable data from massive data as possible, data analysis tasks are becoming more and more complex, which challenges the stability of big data services. Data lake metadata services are widely used as online big data services in big data scenarios, such as Hive metadata services. Metadata can be obtained through the data lake metadata service. Metadata, also known as intermediary data and relay data, is data that describes data. Data analysis tasks often involve multiple accesses to multiple database table partitions, that is, the same data analysis task will also initiate multiple accesses to the data lake metadata service. When the data analysis task is more complex, the stability of the metadata service of the data lake is poor, and the load pressure of metadata storage is high. For example, when metadata is stored in a MySQL database, it will put a lot of load pressure on the MySQL database.

Currently, the limiting processing of the data lake metadata service can be performed by the number of requests per second (QPS). That is, when the QPS of the metadata service exceeds the upper limit of the service system, the access request is subjected to limiting processing. However, different access requests have different load pressures on metadata storage, and the limiting processing of access requests by QPS will make the limiting processing effect poor. For example, the number of access requests received by the data lake metadata service in one second is 100 (possibly access requests initiated by different clients), that is, the QPS is 100. When the number of access requests exceeds 100, limiting processing will be performed, that is, subsequent access requests will be rejected. However, different access requests have different load pressures on the service. For example, after quantizing the access load pressure, if the access requests a has a load pressure of 1 on the metadata store, the access request b has a load pressure of 100 on the metadata store. Then, if the access request a is accepted to access the data lake metadata service 100 times, the access upper limit of the data lake metadata service is reached, and if the access request b is accepted once, the access upper limit of the data lake metadata service is reached. However, if the access request A is still accepted to access the data lake metadata service 100 times, the data lake metadata service may crash, and the load pressure of metadata storage will be extremely high.

Therefore, an access limiting method for metadata server is urgently needed to effectively restrict some accesses and improve service stability. Based on this, an embodiment of the present application provides an access limiting method for a metadata server, an apparatus, and a device, and the method is applied to a data lake metadata server that provides metadata services. The data lake metadata server receives a metadata access request sent by the client, and the request is used for obtaining metadata stored by the storage server for describing target data, and the target data is data in a target table. After receiving the access request, the limiting processing flow of the metadata access request is started. Specifically, the metadata service interface used by the data lake metadata server is first determined according to the obtained metadata access request. When the metadata service interface meets the preset condition, request parameters of the metadata access request are obtained, that is, the number of table partitions and the number of partition levels of the target table. The number of table partitions and the number of partition levels of the target table are used to realize the limiting processing determination of the metadata access request. That is, first, the number of applied tokens corresponding to the metadata access request is determined according to the number of table partitions and the number of partition levels of the target table. When the number of applied tokens corresponding to the metadata access request is larger than the number of remaining tokens corresponding to the client, limiting processing is performed on the metadata access request.

It can be seen that request parameters corresponding to different tables or the same table at different times in the requests received by the metadata service interface satisfying the preset conditions may be different, and the corresponding number of applied tokens may be different. Therefore, the present application can adaptively determine the number of applied tokens corresponding to the metadata access request through the metadata service interface and the request parameters of the metadata access request, and determine whether to perform limiting processing on the metadata access request based on the number of applied tokens. In this way, the service stability of the data lake metadata server can be improved, and the load pressure of the storage server can be reduced.

It can be understood that the defects of the above schemes are the results obtained by the applicant after practice and careful study. Therefore, the discovery process of the above-described problems and the solutions to the above-described problems proposed in the embodiments of the present application below should be contributions made by the applicant to the embodiments of the present application in the process of the present application.

In order to facilitate understanding of the access limiting method for the metadata server provided by the embodiment of the present application, an application scenario of the data lake metadata service and a metadata obtaining process will be described below. Referring to FIG. 1, FIG. 1 is a schematic diagram of an application scenario provided by an embodiment of the present application, and FIG. 1 takes a Hive metadata service and metadata storage in a MySQL database as an example.

Hive library is a data warehouse infrastructure built on Hadoop. Hive library can map structured data files into a database table (or data table). The in-table data of the database tables in the Hive library is stored in the Hadoop distributed file system (i.e. HDFS). The metadata of the database table in the Hive library is stored in the MySQL database, where the MySQL database is an application running on the storage server, and the metadata can be stored by the MySQL database. The metadata is data describing the database table, such as a storage path of the data in the database table in HDFS, a database name of the Hive library, a table name of the database table, a creation time of the database table, and the like.

In practical applications, to access the in-table data of database tables stored in HDFS, it is necessary to obtain the corresponding metadata first. The metadata of the database tables in the Hive library can be retrieved by the Hive metadata service. The Hive Metadata Service (i.e. Hive Metastore) is provided by the metadata server, and the Hive Metadata Service is an application running on the metadata server.

As shown in FIG. 1, there are SQL engines (such as Presto), SparkJar batch flow processing engine, FlinkJar batch flow processing engine, business intelligence BI analysis platform, etc. installed in the client. Taking the Presto engine as an example, the front-end user of the client will enter a query statement in the client, such as an SQL statement, which can be understood as part of the data analysis task. For example, the query statement is select target data from table1. table1 is the database table in the Hive library.

The Presto engine is used to parse the query statement and obtain metadata corresponding to the target data in the query statement. The metadata is used to describe the target data in the query statement, for example, the metadata includes a storage path of the target data in HDFS. Specifically, the Hive metadata service is called to obtain metadata corresponding to the target data. In practice, the MySQL database is accessed by calling the interface of Hive metadata service, and the metadata corresponding to the target data is obtained from the MySQL database. After the Presto engine obtains the metadata corresponding to the target data, it can determine the storage path of the target data according to the metadata corresponding to the target data, so that the target data can be read from the HDFS according to the storage path, and the read target data can be returned to the front end of the client.

In practical applications, as shown in FIG. 1, a data analysis task of a client may initiate multiple accesses to the Hive metadata service. When each access corresponds to a Hive metadata service, a data analysis task may correspond to multiple different Hive metadata services (i.e. multiple Hive metadata service instances), and multiple different Hive metadata services access the same MySQL database. Alternatively, if multiple different clients initiate accesses to different Hive metadata services, multiple Hive metadata services correspond to each Hive metadata service, and each Hive metadata service also accesses the same MySQL database. Among them, each Hive metadata service may run in a different metadata server. At this time, the access pressure of the same MySQL database comes from various Hive metadata services.

As shown in FIG. 1, there is only one MySQL database. In practical applications, in order to alleviate the access pressure of databases, multiple MySQL databases can also be laid out, and the storage servers where multiple MySQL databases are located can be the same or multiple.

It can be understood that when the data analysis task is more complex, the service load pressure is greater. Service load pressure mainly refers to the load pressure of the server. Both the Hive metadata service and the MySQL database belong to the server side. The stability of the service mainly depends on the storage layer, such as the MySQL database. The greater the number of accesses to the Hive metadata service, the greater the load pressure on the MySQL database, which will affect the stability of the Hive metadata service.

Figure 2:
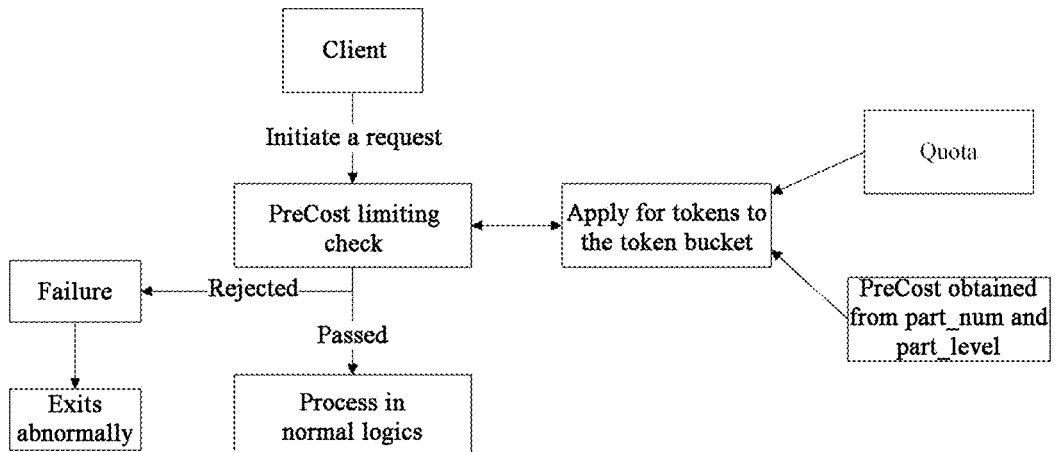
FIG. 2 is a schematic diagram of an example application scenario provided by an embodiment of the present application.

Based on the above, the access limiting method for the metadata server according to the embodiment of the present application will be described below with reference to the scenario example shown in FIG. 2. Referring to FIG. 2, the diagram is a schematic framework diagram of an exemplary application scenario provided by an embodiment of the present application. The method is applied to a data lake metadata server running a metadata service.

The data lake metadata server receives a metadata access request sent by the client, and the request is used to obtain metadata stored by the storage server for describing the target data. The target data is table data in the target table. The target table may be a data table in the Hive library. If the target data is stored in HDFS, the metadata service can be a Hive metadata service. A MySQL database can be running on the storage server.

After receiving the access request, the data lake metadata server starts the limiting check for the metadata access request (which can be referred to as preCost limiting check). Specifically, it is first determined whether the metadata service interface meets the preset condition, and if it meets the preset condition, it is determined whether the limiting processing is performed on the metadata access request through a subsequent limiting step. The subsequent limiting step is specifically to obtain request parameters of the metadata access request, that is, the number of table partitions (expressed as part_num) and the number of partition levels (expressed as part_level) of the target table in the metadata access request. According to the number of table partitions and the number of partition levels of the target table, the number of applied tokens (expressed as preCost) corresponding to the metadata access request is determined, and the corresponding number of tokens is applied to the token server. The token bucket of the token server stores the maximum number of tokens corresponding to each client (denoted as Quota). When the number of applied tokens corresponding to the metadata access request is greater than the number of remaining tokens corresponding to the client, the metadata access request is rejected, and limiting processing is performed. At this time, the front end displays that the access request exits abnormally. When the client sends the metadata access request for the first time, the number of remaining tokens corresponding to the client is the maximum number of tokens corresponding to the client.

It can be understood that if the limiting check is passed, metadata corresponding to the target data is obtained according to processing in normal logics, and the metadata is used to obtain the target data.

It will be understood by those skilled in the art that the schematic frame diagram shown in FIG. 2 is only one example in which embodiments of the present application may be implemented. The scope of application of the embodiments of the present application is not limited by any aspect of this framework.

In order to facilitate understanding of the present application, an access limiting method for a metadata server provided by an embodiment of the present application will be described below with reference to the accompanying drawings.

Figure 3:
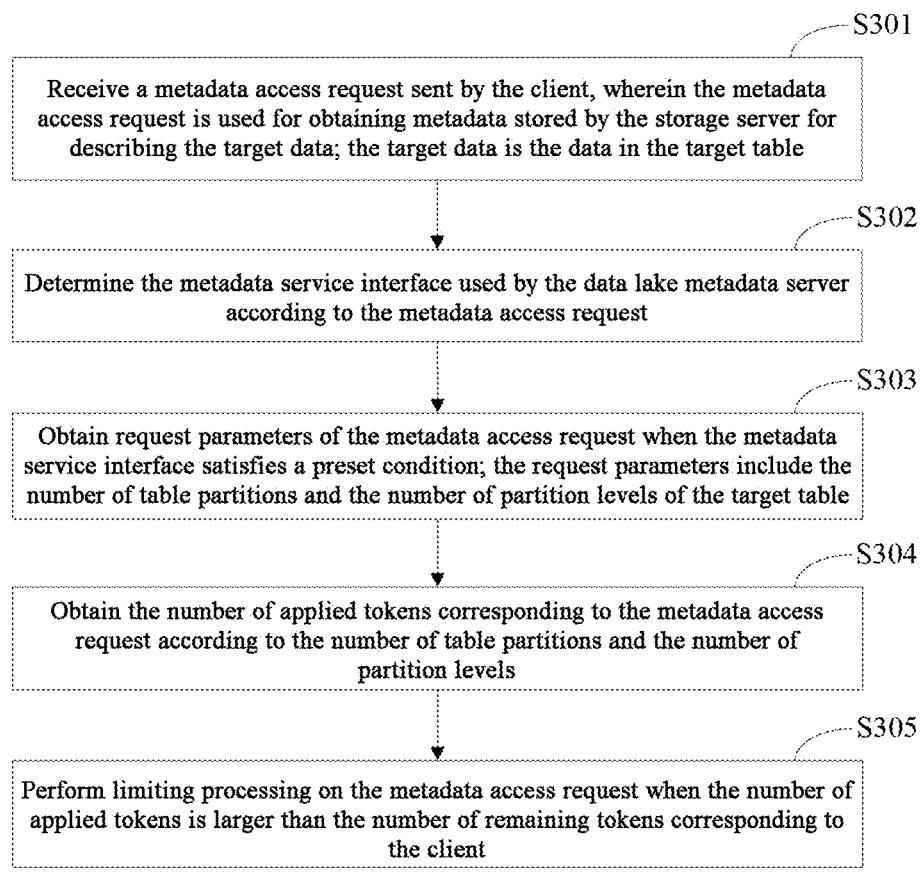
FIG. 3 is a flowchart of an access limiting method for a metadata server according to an embodiment of the present application.

Referring to FIG. 3, the FIG. 3 is a flowchart of an access limiting method for a metadata server according to an embodiment of the present application, and the method can be applied to a data lake metadata server running a data lake metadata service. As shown in FIG. 3, the method may include S301-S305:

S301: Receiving a metadata access request sent by the client, wherein the metadata access request is used for obtaining metadata stored by the storage server for describing the target data; the target data is the data in the target table.

Users can build data analysis tasks on the front end of the client. In the data analysis task, it may be necessary to obtain the target data in the target table, and the target data needs to be obtained through the query statement constructed by the user. First, a query statement is constructed, and the engine of the client parses the query statement to determine that the metadata corresponding to the target data needs to be obtained. As an optional example, metadata corresponding to the target data is obtained by a data lake metadata server running a data lake metadata service (which may be simply referred to as a metadata service in the embodiment of the present application). Therefore, the client sends a metadata access request to the data lake metadata server.

The data lake metadata server receives a metadata access request sent by the client, and the metadata access request is used to obtain metadata describing the target data. Metadata describing the target data is stored in the storage server. As an alternative example, the storage server has a target database running on it, such as an SQL database, and it is necessary to access the target database to obtain metadata describing the target data. When the target database is, for example, an SQL database, the query statement described in the above embodiment is specifically an SQL query statement.

S302: Determining the metadata service interface used by the data lake metadata server according to the metadata access request.

The metadata access request corresponds to the metadata service interface. According to the metadata access request, the metadata service interface corresponding to the metadata access request used by the data lake metadata server can be determined.

It can be understood that there is a plurality of metadata service interfaces of the data lake metadata server, and the access frequency of each service interface is different. Different metadata service interfaces indicate different access types. Different service interfaces/different access types have different access pressures on data lake metadata servers and storage servers.

As an alternative example, the metadata service interface may be get_partitions_by_filter, which is one of the interfaces with the highest frequency of online use of the data lake metadata server and the largest change in the load pressure on the metadata storage. It aims to filter out all partitions under the specified library table that meet the query statement, and the interface is a complex interface. As another alternative example, the metadata service interface may also be get_database, which is a simple interface. Simple interfaces and complex interfaces have different access pressures on data lake metadata servers and storage servers. Therefore, different service interfaces have different rules for obtaining metadata, and the corresponding limiting rules are also different.

S303: obtaining request parameters of the metadata access request when the metadata service interface satisfies a preset condition; the request parameters include the number of table partitions and the number of partition levels of the target table.

It can be understood that even if the same metadata service interface is called, different request parameters in the metadata access request will have different load pressure on metadata storage. The request parameters include the number of table partitions and the number of partition levels of the target table. It will be appreciated that when the number of table partitions in the request parameters is larger and the number of partition levels is larger, the load pressure on the metadata storage may be greater.

Therefore, in this step, it is first determined whether the metadata service interface meets the preset condition, and if it meets the preset condition, it indicates that the access type of the metadata service interface involves access at the table partition and the table partition level. At this point, the request parameters of the metadata access request are obtained. The load pressure of the metadata storage is determined based on the request parameters of the metadata access request, and it is determined whether to carry out limiting processing on the metadata access request.

The preset condition may be a list of metadata service interfaces given in advance, and the metadata service interfaces in the list all involve access to table partitions and table partition levels. For example, the metadata service interface satisfying the preset condition may be the above-described get_partitions_by_filter interface or the drop_table interface. Among them, the drop_table interface is used to delete a data table. It can be understood that when the capacity of the deleted data table (e.g., the larger the number of table partitions, the larger the capacity) is different, the load pressure on the metadata storage is different.

The table partition hierarchy is used to represent the dimensions in which data is stored in a data table. For example, data tables, such as those in the Hive library, can be partitioned by time. For example, if partitions are divided according to "dates", such as January 1st, January 2nd, etc., only data on January 1st is stored in the partition corresponding to January 1st. On this basis, the data table can also be partitioned according to hours, such as 10 o'clock to 11 o'clock, 11 o'clock to 12 o'clock, etc., then the partition corresponding to 10 o'clock to 11 o'clock only stores the data between 10 o'clock and 11 o'clock. If partitioning is only performed by Date, the table partitioning level includes the Date level, and the number of partitioning levels is 1. If the data table is also partitioned by hour, the table partition level includes the "date" level and the "hour" level, and the number of partition levels is 2. It is understood that each partition corresponds to a partition data storage path for indicating a storage address of data in the partition. For example, when all the in-table data in the data table is stored in the HDFS, the storage path of the in-table data in the HDFS is the partition data storage path of the partition where the in-table data is located.

The number of table partitions is the number of each partition occupied by the data in the table stored in the data table. When the table partition hierarchy is multi-hierarchical, the number of table partitions is only the number of individual partitions under the finest table partition hierarchy. For example, when the table partition hierarchy includes a "date" level and an "hour" level, the number of table partitions is the number of each "hour" level partitions used to store data in the table of the data table.

Based on the above, the request parameters of the metadata access request in this step are specifically the number of table partitions and the number of partition levels of the target table. The table partition hierarchy of the target table is used to represent the dimensions in which data is stored in the target table. The number of table partitions of the target table is the number of each partition occupied by the data in the table of the target table. Among them, the number of table partitions can be represented by part_num, and the number of partition levels can be represented by part_level.

It can be understood that the target database stores metadata of each partition of the data table and a partition data storage path corresponding to each partition. In practical applications, the number of table partitions of the target table is obtained by scanning the target database in the storage server. However, some large tables have a large number of partitions, so it will be time-consuming to scan the target database in real time to obtain the number of partitions, and at the same time increase the load pressure of the target database.

Based on this, in a possible implementation, an embodiment of the present application provides a specific implementation for obtaining request parameters of a metadata access request, including:

obtaining the number of table partitions and the number of partition levels of the target table from the memory of the data lake metadata server according to the table name of the target table;

wherein the number of table partitions of the target table is stored in the storage server, and when the data lake metadata server is started, the number of table partitions of the target table is loaded into the memory of the data lake metadata server; the partition level number of the target table is loaded into the memory of the data lake metadata server according to a preset cycle.

It can be understood that in order to reduce the load pressure of the target database and accelerate the process of obtaining the number of table partitions, the memory is used to store the number of table partitions of the data table. Specifically, if the correspondence relationship between the table name of the data table and the number of table partitions of the target table is stored in the memory of the data lake metadata server, the number of table partitions of the target table can be obtained from the memory of the data lake metadata server according to the table name of the target table. In practical applications, the data lake metadata server records the number of table partitions for each data table (such as each data table in the Hive library). When the number of partitions of a data table changes (such as creation or deletion), the corresponding number of table partitions of the record is updated. When the data lake metadata server is started, the number of table partitions of the recorded data table is loaded into the memory of the data lake metadata server, so as to obtain the number of table partitions of the data table from the memory. The target table is similar, so it would not be repeated here.

In addition, the memory may be used to store the number of partition levels of the data table. It will be appreciated that the memory storing the number of table partitions and the number of partition levels may be the same or different. Specifically, if the correspondence relationship between the table name of the data table and the number of partition levels of the target table is stored in the memory, the number of partition levels of the target table can be obtained from the memory of the data lake metadata server according to the table name of the target table. In practical applications, the partition levels of each data table are periodically loaded into memory. For example, it is loaded according to a preset cycle. In a practical application, the data lake metadata server can first construct a partition level number query instruction, and send the partition level number query instruction to the target database. If the target database stores the table partition level of the data table, the partition level number of the data table can be calculated based on the partition level number query instruction.

Based on the above, the number of table partitions and the number of partition levels of the target table can be obtained from the memory of the data lake metadata server, which can speed up the calculation speed of the request parameters, speed up the subsequent process processing speed, and enable the metadata service to achieve low latency and high availability.

S304: Obtaining the number of applied tokens corresponding to the metadata access request according to the number of table partitions and the number of partition levels.

It should be understood that even if the same metadata service interface is called, different data tables to which the data to be obtained in the metadata access request belongs, or the same data table at different times, the number of applied tokens to be obtained may be different due to the difference in the number of table partitions part_num and the number of partition levels part_level of the data table. Even if it is the same data table, as the business develops, the partitions in the data table may change, so that the number of table partitions part_num may also change, and the number of applied tokens corresponding to the obtained metadata access request is also different. Therefore, in the embodiment of the present application, the number of applied tokens corresponding to the metadata access request is determined according to the request parameters (that is, the number of table partitions and the number of partition levels of the target table) in the actually obtained metadata access request.

Taking the get_partitions_by_filter interface as an example, the query statement sent by the front-end user of the client can be get_partitions_by_filter (s: "olap_dev", s1: "hms_monitor", s2: "p_date>=2"). Among them, olap_dev is the database name (for example, Hive library), hms_monitor is the data table name (for example, the name of the target table), and p_date>=2 indicates data with a date greater than or equal to 2 (for example, the target data is data with a date greater than or equal to 2 in hms_monitor), which is the data to be obtained. Since the get_partitions_by_filter interface is used to filter out all partitions in the specified library table that satisfy the query statement, the query result obtained by the query statement includes the metadata of all table partitions with dates greater than or equal to 2 in the hms_monitor table. It can be understood that the get_partitions_by_filter interface is an interface of the Hive metadata service. In this example, after the user sends a query statement, the engine in the client parses the statement, and the Hive metadata service processes the metadata access request, that is, obtains metadata of data satisfying the query statement. The final result may be two table partitions that satisfy the query statement (such as table partition 1 and table partition 2), then the data in table partition 1 and table partition 2 are data with dates greater than or equal to 2. Here, the obtained query result includes metadata such as a partition data storage path of the two table partitions, a partition creation time, a partition creator, a library name of a library to which the partition belongs, and a table name of a table to which the partition belongs. The engine in the client can obtain the metadata, and further, the client engine can read the table data of the table partition 1 and the table partition 2 from the HDFS according to the partition data storage paths of the two table partitions, that is, can obtain the table data with a date greater than or equal to 2.

As can be understood, from the above-described get_partitions_by_filter interface example, when the number of table partitions and the number of partition levels of the target table are larger, the process of obtaining partitions satisfying the query statement from each table partition is more complicated, and the processing cost is higher, and the number of applied tokens required is larger. The number of requisition tokens is used to characterize the processing cost of the metadata access request.

Based on this, in a possible implementation, an embodiment of the present application provides a specific implementation of obtaining the number of applied tokens corresponding to a metadata access request according to the number of table partitions and the number of partition levels, including:

calculating a logarithm of the number of table partitions to obtain a first value;

calculating a product of the first constant, the number of partition levels, and the first value to obtain a second value;

calculating a sum of the second value and the second constant to obtain a third value;

calculating a product of the third value and the third constant as a number of applied tokens for the metadata access request; wherein the first constant, the second constant, and the third constant are related to the configuration of the storage server.

According to this embodiment, when the number of table partitions is represented by part_num, the number of partition levels is represented by part_level, the first constant, the second constant, and the third constant are represented by x, y, and z, respectively, and the number of applied tokens is represented by pre_cost, the formula for calculating the number of applied tokens can be expressed as: pre_cost= (x*part_level*log (part_num)+y)*z.

wherein the calculated first value is log (part_num), the second value is x*part_level*log (part_num), and the third value is (x*part_level*log (part_num)+y). where: log (part_num) is the logarithm of part_num based on 10.

As an optional example, the metadata service interface that satisfies the preset condition may be the get_partitions_by_filter interface. The get_partitions_by_filter interface is one of the interfaces that is most frequently used online and has the largest change in metadata storage load pressure. You can perform stress testing through the get_partitions_by_filter interface, and simultaneously initiate requests for stress testing on online data tables with different partition levels and different number of partitions to obtain stress test data. And obtaining a calculation formula of the number of applied tokens corresponding to the metadata access request based on the stress test data fitting, mainly to obtain a fitted first constant, a second constant and a third constant. Wherein, the stress test data includes the number of table partitions, the number of partition levels of each data table, and the number of applied tokens corresponding to the metadata access request.

It can be understood that the above-described formula for calculating the number of applied tokens corresponding to the metadata access request can be applied to any metadata service interface that relates to the number of table partitions and the level of table partitions and satisfies a preset condition.

It is also understood that the first constant x, the second constant y, and the third constant z may be collectively referred to as formula parameters, and the formula parameters are related to the configuration of the storage server. If the configuration of the storage server is different, the formula parameters fitted according to the stress test data are different. For example, when a 20-core virtual machine for a server is stored, the formula for calculating the number of applied tokens obtained may be pre_cost=0.5227*part_level*log (part_num)+1.3747, wherein the first constant x is 0.5227, the second constant y is 0, and the third constant z is 1.3747. If the storage server is configured differently, the formula parameters change accordingly.

S305: Performing limiting processing on the metadata access request when the number of applied tokens is larger than the number of remaining tokens corresponding to the client.

In practical applications, the token bucket of the token server stores tokens corresponding to each client, and the number of tokens corresponding to each client may be different. Before the client applies for the token, the number of tokens corresponding to the client stored in the token server is the maximum number of tokens. When the client applies to the token server for tokens needed for access, if the application is passed, the corresponding number of tokens will be taken out from the token bucket, and the remaining tokens in the token bucket will be used by the client when subsequently applying.

After acquiring the number of applied tokens pre_cost corresponding to the metadata access request, it is possible to determine whether to trigger the limiting process based on the pre_cost before the request is executed. Specifically, the required token is applied to the token server, and the number of applied tokens corresponding to the metadata access request is transmitted to the token server. The token server is provided with a token bucket, and the token is stored in the token bucket. As an optional example, the token server may be a Redis server. The script logic set by the token server compares the number of applied tokens with the number of remaining tokens corresponding to the stored client. If the number of applied tokens is greater than the number of remaining tokens corresponding to the client, it means that the number of remaining tokens in the token bucket cannot meet the requirements. The token server returns the failed result to the data lake metadata server. At this time, the limiting check fails, the access request is unsuccessful, and the metadata server of the data lake rejects the metadata access request. In this way, it can ensure high concurrency and low delay of metadata service, and at the same time, it can intercept abnormal access requests.

It can be understood that since new tokens will continue to be generated in the token bucket, the metadata access request can be resent after the current is limited.

In addition, if the number of applied tokens is less than or equal to the number of remaining tokens corresponding to the client, it means that the number of remaining tokens in the token bucket can meet the requirements. At this time, the same number of tokens as the number of applied tokens is deducted from the token server. The token server returns the result of the successful application to the data lake metadata server. At this time, the limiting check is passed, the access request is successful, and the data lake metadata server executes the metadata access request.

Based on the relevant contents of S301-S305, it can be seen that the present application provides an access limiting method for a metadata server, and the method is applied to a data lake metadata server that provides metadata services. The data lake metadata server receives a metadata access request sent by the client, and the request is used for obtaining metadata stored by the storage server for describing target data, and the target data is data in a target table. After the access request is received, the limiting processing flow of the metadata access request is started. Specifically, the metadata service interface used by the data lake metadata server is first determined according to the obtained metadata access request. When the metadata service interface meets the preset condition, obtaining request parameters of the metadata access request, that is, the number of table partitions and the number of partition levels of the target table. The number of table partitions and the number of partition levels of the target table are used to realize the limiting processing determination of the metadata access request. That is, first, the number of applied tokens corresponding to the metadata access request is determined according to the number of table partitions and the number of partition levels of the target table. When the number of applied tokens corresponding to the metadata access request is larger than the number of remaining tokens corresponding to the client, limiting processing is performed on the metadata access request.

It can be seen that request parameters corresponding to different tables or the same table at different times in the requests received by the metadata service interface satisfying the preset conditions may be different, and the corresponding number of applied tokens may be different. Therefore, the present application can adaptively determine the number of applied tokens corresponding to the metadata access request through the metadata service interface and the request parameters of the metadata access request, and determine whether to perform limiting processing on the metadata access request based on the number of applied tokens. In this way, the service stability of the data lake metadata server can be improved, and the load pressure of the storage server can be reduced.

It can be seen that when the client does not consume the token in the token server, the number of tokens corresponding to the client stored in the token server is the maximum number of tokens. It should be understood that the number of tokens/maximum number of tokens corresponding to the client described in the embodiments of the present application are all for the data lake metadata server. The maximum number of tokens corresponding to the client can be expressed by Quota, which can also be understood as a Quota. Quota represents the sum of tokens allowed by the client to execute the request on the data lake metadata server within 1 minute. Since the request sent by the client to the data lake metadata server is for accessing the target database in the storage server, the number of tokens can also be understood as the maximum number of tokens for the client to access the target database. In practical applications, when a plurality of data lake metadata server instances corresponds to one target database instance, the total number of tokens required for a single target database to be accessed is related to the number of tokens required for each data lake metadata server example to consume. It will be appreciated that the number of tokens corresponding to each client stored in the token server may differ.

Based on this, in a possible implementation, an embodiment of the present application provides a process for obtaining a maximum number of tokens corresponding to a client, including:

A1: Determining the address of the corresponding data lake metadata server according to the database name of the database to which the target table belongs, and determining the number of storage servers corresponding to the data lake metadata server according to the address of the data lake metadata server.

Since different data warehouses (such as Hive Library) may use the same or different data lake metadata servers (such as Hive Library), there is a routing relationship/correspondence relationship between the data warehouse and the addresses of the data lake metadata servers used. Based on this, if there is also a routing relationship between the database to which the target table belongs and the address of the data lake metadata server, the address of the corresponding data lake metadata server can be determined according to the database name of the database to which the target table belongs.

In order to relieve the pressure of database access, a data lake metadata server can lay out multiple storage servers. If there is one target database running on a storage server, there are multiple target databases. After the address of the data lake metadata server is determined, the number of storage servers corresponding to the data lake metadata server may be determined according to the address.

A2: Calculating the maximum number of tokens corresponding to the client according to the number of storage servers corresponding to the data lake metadata server and the number of tokens of a single storage server; the number of tokens of a single storage server is related to the statistics of the number of tokens consumed by the online access request of the storage server per unit time and the hardware usage rate of the storage server.

The number of tokens of a single storage server is the upper limit number of tokens that a single storage server allows a client to consume, and the number of tokens of each storage server may be the same or different. As an optional example, when the number of tokens of each storage server corresponding to the data lake metadata server is the same, the maximum number of tokens corresponding to the client is a product of the number of storage servers corresponding to the data lake metadata server and the number of tokens of a single storage server. As another optional example, when the number of tokens of each storage server corresponding to the data lake metadata server is different, the maximum number of tokens corresponding to the client is the sum of the number of each storage server corresponding to the data lake metadata server.

The number of tokens of a single storage server is related to the statistics of the number of tokens consumed by online access requests of the storage server per unit time and the hardware usage rate of the storage server. Among them, the statistics of the number of tokens consumed by the online access request of the storage server per unit time are obtained through experiments. Hardware usage includes CPU usage and/or memory usage, etc.

In the actual test process, the average or peak value of the number of tokens consumed by the metadata access request received by the online storage server per unit time (such as 1 minute) is counted, and the average or peak value is the statistic of the number of tokens. For example, the mean is 1500 tokens. Further, the CPU usage rate at this time is recorded, for example, 10%, 10% CPU usage corresponds to an average of 1500. As an optional example, the number of tokens for a single storage server is the number of tokens corresponding to the allowed CPU usage of the storage server. For example, if the allowed CPU usage rate is 20%, and the storage server can still work normally under this usage rate, according to the proportional relationship, the number of tokens corresponding to the 20% CPU usage rate is twice the above statistical number of tokens, that is, 3000 tokens.

It can be understood that the above trial procedure is related to the configuration of the storage server (for example, the configuration of the target database), and when the configuration of the storage server is changed, the number of tokens of the corresponding individual storage server will also change.

It can be seen that before the limiting function of the data lake metadata server goes online, it is necessary to estimate the maximum number of tokens corresponding to each client, which can be called the estimated maximum number of tokens, so that the limiting function of the data lake metadata server goes online normally. Therefore, in practical applications, it is necessary to obtain the estimated maximum number of tokens corresponding to the client.

As an optional example, the estimated maximum number of tokens corresponding to the client is estimated based on the stress test data of a data table with the largest online capacity and the most commonly used data table. For example, during the stress test, the number of requests processed by a single storage server instance in one minute is 445. At this time, the CPU utilization rate of the storage server reaches 40%. Furthermore, taking a typical actual number of requests (that is, the number of results returned by requests) as 72 (most online requests return less than 100 results), the number of actually-used tokens is 42 (see below for the calculation method). Then, when the CPU usage rate is 40%, the estimated maximum number of tokens is 445*42=18690. If the CPU usage rate is 10%, the estimated maximum number of tokens corresponding to a single storage server is 18690/4=4672. It can be understood that if the number of storage servers is multiple, the estimated maximum number of tokens corresponding to each storage server can be determined in this manner. It can be understood that the token corresponding to the client is used to access the storage server, that is, the estimated maximum number of tokens corresponding to the storage server is the estimated maximum number of tokens corresponding to the client.

It can be seen that there are still some metadata service interfaces that do not meet the set preset conditions. At this time, the access limiting method for the metadata server provided by the embodiment of the present application may further include the following steps:

determining whether to perform limiting processing on the metadata access request according to the limiting rule of the metadata service interface, when the metadata service interface does not satisfy the preset condition.

S303-S305 described in the above embodiments can be understood as limiting rules of the metadata service interface under preset conditions. When the metadata service interface does not satisfy the preset condition, it indicates that the access type of the metadata service interface does not involve the access of the table partition. At this time, the metadata service interface that does not satisfy the preset condition corresponds to its own limiting rule, and there is no need to use the access request limiting procedure described in S 303 to S 305.

The limiting rule of the metadata service interface that does not satisfy the preset condition is related to the metadata obtaining mode of the metadata service interface. Some metadata service interfaces (such as the get_table interface) obtain metadata through indexes, and there is no need to scan the target database to obtain the metadata corresponding to the target data that meets the query conditions. For example, the client records a correspondence relationship between the index and the target data, and when it is determined that the target data is to be obtained, the index of the target data can be determined according to the correspondence relationship, and the index of the target data is used to indicate a storage location of the target data in the HDFS. It can be seen that the method for determining the storage location of the target data by indexing does not need to scan the target database in a large range in the storage server, and the load pressure on the target database is small, usually at a constant level. At this time, the limiting can be performed by QPS. Here, the specific limiting rule can be set according to the actual metadata service interface only as an example for the description of the limiting rule, and the specific limiting rule can be set according to the actual metadata service interface.

For example, some other metadata service interfaces do not obtain information at the table partition level, but obtain information at the table level. At this time, the limiting needs to be performed according to the limiting rule of the metadata service interface itself, which is not repeated here.

Figure 4:
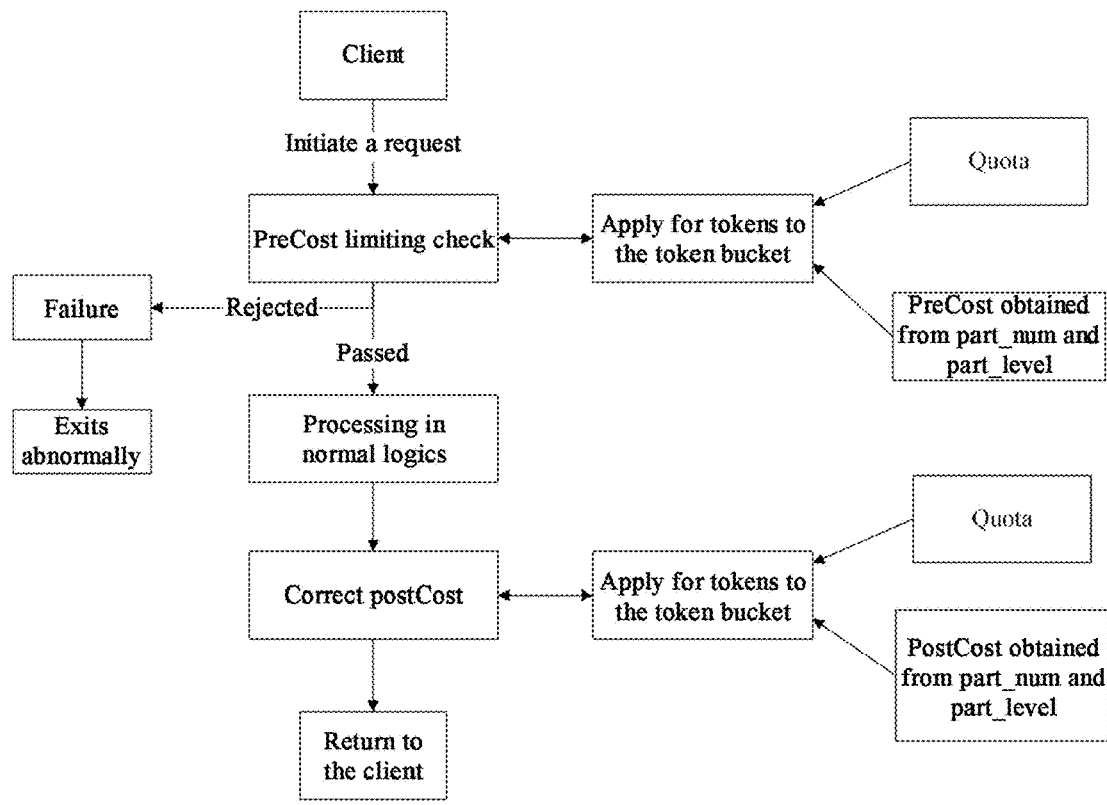
FIG. 4 is a schematic diagram of another example application scenario provided by an embodiment of the present application.

Referring to FIG. 4, FIG. 4 is a schematic diagram of another exemplary application scenario provided by an embodiment of the present application. As shown in FIG. 4, after normal logical processing (that is, the metadata access request is executed without limiting processing), the number of actually-used tokens will also be obtained, and the number of actually-used tokens can be represented by post-Cost. Further, a correction of the number of tokens used for the metadata access request (i.e., the postCost correction shown in FIG. 4) is performed. Before the correction process, the actual number of table partitions returned after the metadata access request is executed will be obtained, which can be represented by result_num. Then use part_num, part_level, and result_num to calculate the postCost. Further, the token server requests the postCost number of tokens to complete the postCost correction, and returns the token to the client.

Figure 5:
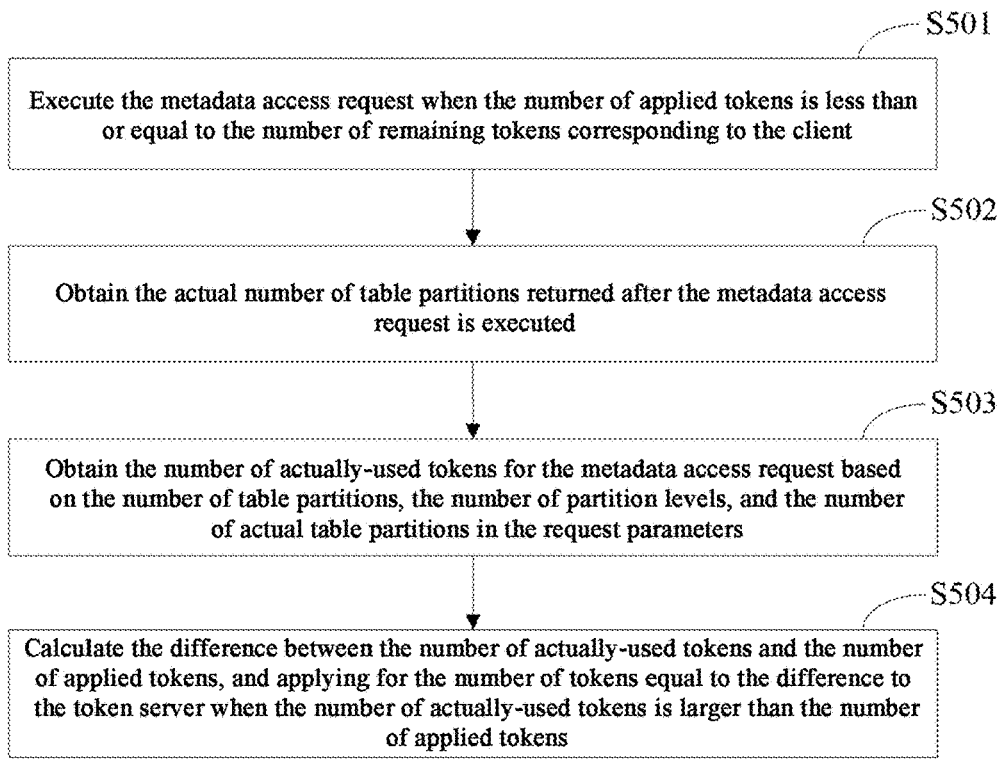
FIG. 5 is a flowchart of another access limiting method for a metadata server according to an embodiment of the present application.

Referring to FIG. 5, FIG. 5 is a flowchart of another access limiting method for a metadata server provided by an embodiment of the present application, in which the method describes a process of how to correct the number of tokens used in a metadata access request, and the method includes S501-S504:

S501: Executing the metadata access request when the number of applied tokens is less than or equal to the number of remaining tokens corresponding to the client.

When the number of applied tokens is less than or equal to the number of remaining tokens corresponding to the client, the limiting process is not performed, and a metadata access request is executed, that is, the storage server is accessed to obtain metadata describing the target data. The metadata includes a database name, a table name, a creation time, and storage information to which the filtered partition belongs, and the storage information includes an HDFS path of the partition to which the filtered target data belongs.

It can be understood that the number of remaining tokens corresponding to the client is the number of remaining tokens corresponding to the client stored in the token server when the limiting logic determination is performed on the metadata access request.

S502: Obtaining the actual number of table partitions returned after the metadata access request is executed.

After the metadata access request is executed, the number of results that actually satisfy the query statement will be returned (also called the number of records returned by the query). This number of results is the number of partitions of the partition to which the target data in the query statement belongs, that is, the actual number of table partitions. For example, taking the above example as an example, the target data in the query statement is data with a date greater than or equal to 2, and the table partitions satisfying the query statement are table partition 1 and table partition 2. Then the actual number of table partitions is 2, that is, the number of results is 2. Each result includes metadata for a table partition, such as metadata for table partition 1 and metadata for table partition 2. Since the data in the table partition 1 and the table partition 2 are target data, the metadata of the table partition 1 and the table partition 2 are metadata describing the target data.

S503: Obtaining the number of actually-used tokens for the metadata access request based on the number of table partitions, the number of partition levels, and the number of actual table partitions in the request parameters.

In practical applications, it is determined through stress testing that the number of tokens used in metadata access requests is related to the number of table partitions part_num, the number of partition levels part_level and the actual number of table partitions result_num. The actual number of table partitions can only be obtained after the metadata access request is executed. Therefore, the impact of the actual number of table partitions result_num on the number of tokens used by the metadata access request can only be calculated after the metadata access request is executed.

It can be understood that if the same data table (that is, the data table to which the target data belongs, such as the hive table), if part_num and part_level are the same and result_num is different, it means that the number of tokens used in the metadata access request may also be different.

Specifically, based on the number of table partitions, the number of partition levels, and the number of actual table partitions in the request parameters, the number of actually-used tokens of the metadata access request is obtained.

In a possible implementation, an embodiment of the present application provides a specific implementation for obtaining a number of actually-used tokens in a metadata access request based on the number of table partitions, the number of partition levels, and the actual number of table partitions in request parameters, including:

calculating a logarithm of the number of table partitions to obtain a first value;
calculating a logarithm of the actual table partition number to obtain a second value;
calculating a product of the fourth constant, the number of partition levels, the first value, and the second value as a number of actually-used tokens for the metadata access request; The fourth constant is related to the configuration of the storage server.

According to this embodiment, when the number of table partitions is represented by part_num, the number of partition levels is represented by part_level, the actual number of table partitions is represented by result_num, the fourth constant is represented by a, and the number of actually-used tokens is represented by post_cost, the calculation formula of the number of actually-used tokens can be expressed as: post_cost=a*part_level*log (part_num)*log (result_num).

wherein the calculated first value is log (part_num); the second value is log (result_num), which is the logarithm of base 10 result_num. The calculation formula of the number of actually-used tokens is similar to the calculation formula of the number of applied tokens, both of which are obtained by stress test fitting. The fourth constant a is obtained in a similar manner to the first constant, the second constant and the third constant, and the fourth constant is also a formula parameter. For example, when storing a 20-core virtual machine used by the server, the formula for calculating the number of actually-used tokens is: post_cost=0.8214*part_level*log (part_num)*log (result_num), and the fourth constant a is 0.8214.

S504: Calculating the difference between the number of actually-used tokens and the number of applied tokens, and applying for the number of tokens equal to the difference to the token server when the number of actually-used tokens is larger than the number of applied tokens.

When the number of actually-used tokens is greater than the number of applied tokens, it means that the pre-calculated number of applied tokens is low and needs to be corrected. At this time, the token server is accessed again, and the number of tokens (number of actually-used tokens-number of applied tokens) is requested. In addition, the token server also needs to recalculate the number of remaining tokens corresponding to the client, and reflect it in the next request limiting.

It is understandable that when the application fails, you can directly enter the follow-up processing process. The subsequent processing flow is the limiting processing flow of the next metadata access request.

According to the relevant contents of S501-S504, in order to perform limiting processing of the metadata access request, the number of applied tokens is calculated based on the metadata service interface and the request parameters of the metadata access request (the number of table partitions and the number of table partition levels). When the number of applied tokens meets the requirement, a metadata access request is executed. After the metadata access request is executed, the actual table partition number, returned after the metadata access request is executed, is obtained, and the number of tokens used by the metadata access request is corrected based on the actual table partition number, so that the total number of tokens applied by the client to the token server is the number of actually-used tokens. In this way, the number of remaining tokens of the client stored in the token server can be made more accurate, so that the limiting processing result of the metadata access request of the client next time can be more accurate.

Those skilled in the art will understand that in the above-described method of the detailed embodiment, the order in which the steps are written does not mean a strict order of execution and constitutes any limitation on the implementation process, and the specific order of execution of the steps should be determined by its function and possible internal logic.

In addition to the implementations provided in the above aspects, the present application may be further combined to provide more implementations.

Based on an access limiting method for a metadata server provided by the above-described method embodiment, the embodiment of the present application further provides an access limiting device of the metadata server, and the access limiting device of the metadata server will be described below with reference to the accompanying drawings. Since the principle of solving the problem by the device in the embodiment of the present disclosure is similar to the access limiting method for the metadata server described above in the embodiment of the present application, the implementation of the device can refer to the implementation of the method, and the redundancy will not be repeatedly described.

Figure 6:
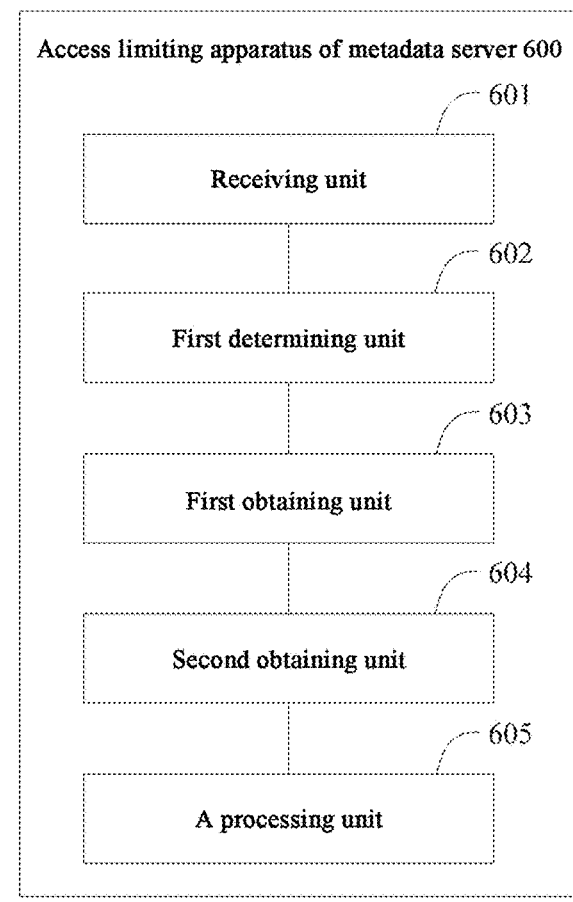
FIG. 6 is a schematic structural diagram of an access limiting apparatus of a metadata server according to an embodiment of the present application.

Referring to FIG. 6, the FIG. 6 is a schematic structural diagram of an access limiting apparatus 600 for a metadata server according to an embodiment of the present application. As shown in FIG. 6, the access limiting device of the metadata server includes:

a receiving unit 601, configured to receive a metadata access request sent by a client, wherein the metadata access request is configured to obtain metadata stored by a storage server for describing target data; the target data is data in a target table;

a first determining unit 602, configured to determine a metadata service interface used by the data lake metadata server according to the metadata access request;

a first obtaining unit 603, configured to obtain request parameters of the metadata access request when the metadata service interface satisfies a preset condition; The request parameters includes a number of table partitions and a number of partition levels of the target table;

a second obtaining unit 604 is configured to obtain the number of applied tokens corresponding to the metadata access request according to the number of table partitions and the number of partition levels;

a processing unit 605 is configured to perform limiting processing on the metadata access request when the number of applied tokens is greater than the number of remaining tokens corresponding to the client.

In a possible implementation, the second obtaining unit 604 includes:

a first calculation sub-unit configured to calculate a logarithm of the number of table partitions to obtain a first value;

a second calculation sub-unit configured to calculate a product of a first constant, the number of partition levels, and the first value to obtain a second value;

a third calculation sub-unit configured to calculate a sum of the second value and a second constant to obtain a third value;

a fourth calculation sub-unit configured to calculate a product of the third value and a third constant as a number of applied tokens for the metadata access request; wherein the first constant, the second constant, and the third constant are related to a configuration of the storage server.

In one possible implementation, the apparatus further comprises:

an execution unit configured to execute the metadata access request when the number of applied tokens is less than or equal to the number of remaining tokens corresponding to the client;

a third obtaining unit configured to obtain an actual table partition number returned after execution of the metadata access request;

a fourth obtaining unit configured to obtain a number of actually-used tokens of the metadata access request based on the number of table partitions, the number of partition levels, and the actual number of table partitions in the request parameters;

an application unit configured to calculate a difference between the number of actually-used tokens and the number of applied tokens when the number of actually-used tokens is larger than the number of applied tokens, and apply to a token server for a number of tokens equal to the difference.

In a possible implementation, the fourth obtaining unit comprises:

a fifth calculation sub-unit configured to calculate a logarithm of the number of table partitions to obtain a first value;

a sixth calculation sub-unit configured to calculate a logarithm of the actual table partition number to obtain a second value;

a seventh calculation sub-unit configured to calculate a product of a fourth constant, the number of partition levels, the first value, and the second value as a number of actually-used tokens of the metadata access request;
The fourth constant is related to a configuration of the storage server.

In a possible implementation, the first obtaining unit 603 is specifically configured to:

obtaining the number of table partitions and the number of partition levels of the target table from the memory of the data lake metadata server according to the table name of the target table;

wherein the number of table partitions of the target table is stored in the storage server, and when the data lake metadata server is started, the number of table partitions of the target table is loaded into the memory of the data lake metadata server; the partition level number of the target table is loaded into the memory of the data lake metadata server according to a preset cycle.

In one possible implementation, the client corresponds to a maximum number of tokens; the process of obtaining the maximum number of tokens corresponding to the client includes: determining an address of a corresponding data lake metadata server according to a library name of a library to which the target table belongs, and determining a number of storage servers corresponding to the data lake metadata server according to the address of the data lake metadata server; calculating a maximum number of tokens corresponding to the client according to the number of storage servers corresponding to the data lake metadata server and the number of tokens of a single storage server; wherein the number of tokens of a single storage server is related to the statistics of the number of tokens consumed by the online access request of the storage server per unit time and the hardware usage rate of the storage server.

In one possible implementation, the apparatus further comprises:

a second determining unit configured to determine whether to perform limiting processing on the metadata access request according to a limiting rule of the metadata service interface when the metadata service interface does not satisfy the preset condition.

It should be noted that the specific implementation of each unit in the present embodiment can be referred to the relevant description in the above method embodiment. The division of units in the embodiments of the present application is schematic, and is only a logical function division, and there may be another division mode when actually implemented. Each functional unit in the embodiment of the present application may be integrated in one processing unit, each unit may physically exist alone, or two or more units may be integrated in one unit. For example, in the above-described embodiment, the processing unit and the transmission unit may be the same unit or different units. The above-described integrated unit may be implemented in the form of hardware or software functional unit.

Based on the access limiting method for the metadata server provided by the above-described method embodiment, the present application further provides an electronic device, including: one or more processors; a storage having one or more programs stored thereon, and the one or more programs when being executed by the one or more processors, cause the one or more processors to implement the access limiting method for the metadata server according to any of the above embodiments, wherein the one or more programs are executed by the one or more processors, and the one or more processors implement the access limiting method for the metadata server according to any of the above embodiments, wherein the one or more programs are executed by the one or more processors.

Figure 7:
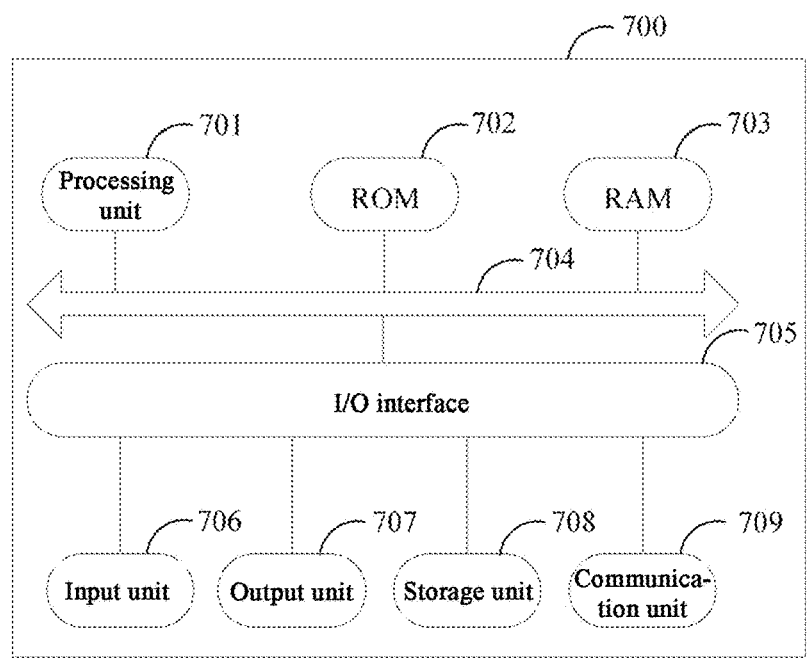
FIG. 7 is a schematic diagram of a basic structure of an electronic device according to an embodiment of the present application.

Referring below to FIG. 7, a schematic structural diagram of an electronic device 700 suitable for implementing an embodiment of the present application is shown. The terminal device in the embodiment of the present application may include, but is not limited to, a mobile terminal such as a mobile phone, a notebook computer, a digital broadcast receiver, a PDA (Personal Digital Assistant), a PAD (portable android device), a PMP (Portable Media Player), a vehicle terminal (for example, a vehicle navigation terminal), and the like, and a fixed terminal such as a digital TV (television), a desktop computer, and the like. The electronic device illustrated in FIG. 7 is merely an example, and should not impose any limitation on the functions and scope of use of the embodiments of the present application.

As shown in FIG. 7, the electronic apparatus 700 may include a processing device (such as a central processing unit, a graphics processor, or the like) 701 that may perform various appropriate actions and processes according to a program stored in a read-only memory (ROM) 702 or a program loaded from a storage device 708 into a random access memory (RAM) 703. The RAM 703 also stores various programs and data necessary for the operation of the electronic device 700. The processing device 701, the ROM 702, and the RAM 703 are connected to each other by a bus 704. An input/output (I/O) interface 705 is also connected to the bus 704.

Generally, the following devices may be connected to the I/O interface 705: an input device 706 including, for example, a touch screen, a touch pad, a keyboard, a mouse, a camera, a microphone, an accelerometer, a gyroscope, and the like; an output device 707 including, for example, a liquid crystal display (LCD), a speaker, a vibrator, or the like; a storage device 708 comprising, for example, a magnetic tape, a hard disk, or the like; and a communication device 709. The communication device 709 may allow the electronic device 700 to communicate wirelessly or wired with other devices to exchange data. While FIG. 7 shows an electronic device 700 with various devices, it should be understood that it is not required that all of the devices shown be implemented or provided. More or fewer devices may alternatively be implemented or provided.

In particular, according to embodiments of the present application, the processes described above with reference to the flowcharts may be implemented as computer software programs. For example, embodiments of the present application include a computer program product comprising a computer program carried on a non-transitory computer-readable medium, the computer program including program code for performing the method shown in the flowchart. In such embodiments, the computer program may be downloaded and installed from the network via the communication device 709, or installed from the storage device 708, or installed from the ROM 702. When the computer program is executed by the processing apparatus 701, the above-described functions defined in the method for the embodiment of the present application are executed.

The electronic device provided by the embodiment of the present application and the access limiting method for the metadata server provided by the above-described embodiment belong to the same inventive concept, and the technical details not described in detail in the present embodiment can be referred to in the above-described embodiment, and the present embodiment has the same beneficial effects as the above-described embodiment.

Based on an access limiting method for a metadata server provided by the above-described method embodiment, an embodiment of the present application provides a computer-readable medium storing a computer program thereon, wherein when the program is executed by a processor, the access limiting method for the metadata server described in any of the above-described embodiments is implemented.

The computer-readable medium described in the present application may be a computer-readable signal medium, a computer-readable storage medium, or any combination thereof. The computer-readable storage medium may be, for example, but is not limited to, an electrical, magnetic, optical, electromagnetic, infrared, or semiconductor system, apparatus, or device, or a combination of any of the above. More specific examples of computer-readable storage media may include, but are not limited to, an electrical connection having one or more wires, a portable computer magnetic disk, a hard disk, a random access memory (RAM), a read-only memory (ROM), an erasable programmable read-only memory (EPROM or flash memory), an optical fiber, a portable compact magnetic disk read-only memory (CD-ROM), an optical storage device, a magnetic storage device, or any suitable combination of the foregoing. In the present application, a computer-readable storage medium may be any tangible medium containing or storing a program that may be used by or in conjunction with an instruction execution system, apparatus, or device. In the present application, the computer-readable signal medium may comprise a data signal propagated in a baseband or as part of a carrier wave, carrying computer-readable program code therein. Such propagated data signals may take a variety of forms, including, but not limited to, electromagnetic signals, optical signals, or any suitable combination of the foregoing. The computer-readable signal medium may also be any computer-readable medium other than a computer-readable storage medium that may transmit, propagate, or transmit a program for use by or in connection with an instruction execution system, apparatus, or device. The program code contained on the computer-readable medium may be transmitted using any suitable medium, including, but not limited to, wires, optical cables, RF (radio frequency), or the like, or any suitable combination of the foregoing.

In some embodiments, the client, server may communicate using any currently known or future developed network protocol, such as HTTP (Hyper Text Transfer Protocol), and may be interconnected with any form or medium of digital data communication (e.g., a communication network). Examples of communication networks include local area networks ("LAN"), wide area networks ("WAN"), the Internet (e.g., the Internet), and end-to-end networks (e.g., ad hoc end-to-end networks), as well as any currently known or future-developed networks.

The computer-readable medium described above may be included in the electronic device described above; It may also exist alone without being assembled into the electronic device.

The computer-readable medium carries one or more programs, and when the one or more programs are executed by the electronic device, the electronic device executes the access limiting method for the metadata server.

Computer program code for performing the operations of the present application may be written in one or more programming languages, or combinations thereof, including, but not limited to, object-oriented programming languages, such as Java, Smalltalk, C++, but also conventional procedural programming languages, such as the "C" language or similar programming languages. The program code may be executed entirely on the user's computer, partially on the user's computer, as a stand-alone software package, partially on the user's computer and partially on a remote computer, or entirely on a remote computer or server. In cases involving a remote computer, the remote computer may be connected to the user computer through any kind of network, including a local area network (LAN) or a wide area network (WAN), or may be connected to an external computer (e.g., using an Internet service provider to connect over the Internet).

The flowcharts and block diagrams in the drawings illustrate the architecture, functionality, and operation of possible implementations of systems, methods, and computer program products in accordance with various embodiments of the present application. In this regard, each block in the flowchart or block diagram may represent a module, program segment, or portion of code that contains one or more executable instructions for implementing a specified logical function. It should also be noted that, in some alternative implementations, the functions noted in the blocks may also occur in a different order than that noted in the drawings. For example, two blocks represented in succession may actually be executed substantially in parallel, and they may sometimes be executed in reverse order, depending on the function involved. It is also noted that each block in the block diagrams and/or flowchart diagrams, and combinations of blocks in the block diagrams and/or flowchart diagrams, may be implemented with a dedicated hardware-based system that performs the specified functions or operations, or may be implemented with a combination of dedicated hardware and computer instructions.

The units described in the embodiments of the present application may be implemented by software or hardware. Here, the name of the unit/module does not constitute a limitation of the unit itself in some cases, for example, the voice data obtaining module may also be described as a "data obtaining module".

The functions described above herein may be performed, at least in part, by one or more hardware logic components. For example, and without limitation, exemplary types of hardware logic components that may be used include: a field programmable gate array (FPGA), an application specific integrated circuit (ASIC), an application specific standard product (ASSP), a system-on-chip (SOC), a complex programmable logic device (CPLD), and the like.

In the context of the present application, a machine-readable medium may be a tangible medium that may contain or store a program for use by or in conjunction with an instruction execution system, apparatus, or apparatus. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include one or more line-based electrical connections, portable computer disks, hard disks, random access memory (RAM), read-only memory (ROM), erasable programmable read-only memory (EPROM or flash memory), optical fibers, handy compact disk read-only memory (CD-ROM), optical storage devices, magnetic storage devices, or any suitable combination of the foregoing.

It should be noted that, in the present specification, each embodiment is described in a stepwise manner, and each embodiment focuses on differences from other embodiments, and the same and similar parts between the embodiments may be referred to each other. For the system or device disclosed in the embodiment, since the system or device corresponds to the method disclosed in the embodiment, the description is relatively simple, and the description of the method section can be referring to for related details.

It should be understood that in the present application, "at least one" refers to one or more, and "a plurality" refers to two or more. "and/or" is used to describe the association relationship of the association object, and means that there can be three relationships. For example, "A and/or B" can mean that only A exists, only B exists, and A and B exist at the same time, where A and B may be singular or plural. The character "/" generally indicates that the associated objects before and after are an "or" relationship. "At least one of the following" or a similar expression thereof refers to any combination of these items, including any combination of single or plural items. For example, at least one(s) of a, b, or c may represent: a, b, c, "a and b", "a and c", "b and c", or "a and b and c", wherein a, b, c may be single or multiple.

It should also be noted that, herein, relational terms such as first and second are used only to distinguish one entity or operation from another entity or operation, and do not necessarily require or imply that any such actual relationship or order exists between the entities or operations. Furthermore, the terms "comprising," "comprising," or any other variation thereof are intended to encompass a non-exclusive inclusion such that a process, method, article, or apparatus comprising a series of elements includes not only those elements but also other elements not explicitly listed, or elements inherent to such a process, method, article, or apparatus. Without further limitation, an element defined by the statement "comprising a" does not preclude the presence of additional identical elements in a process, method, article, or apparatus comprising the element.

The steps of the methods or algorithms described in connection with the embodiments disclosed herein may be implemented directly in hardware, a processor-executed software module, or a combination of both. The software module may be placed in random access memory (RAM), memory, read-only memory (ROM), electrically programmable ROM, electrically erasable programmable ROM, registers, hard disk, removable magnetic disk, CD-ROM, or any other form of storage medium known in the art.

The above description of the disclosed embodiments enables those skilled in the art to implement or use the present application. Various modifications to these embodiments will be apparent to those skilled in the art, and the general principles defined herein may be implemented in other embodiments without departing from the spirit or scope of the present application. Accordingly, the present application will not be limited to the embodiments shown herein, but is intended to accord the widest scope consistent with the principles and novel features disclosed herein.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims. With respect to the apparatus in the above-described embodiments, the specific manner in which the various modules perform the operations has been described in detail in the embodiments of the method and will not be described in detail herein.

We claim:

1. An access limiting method for a metadata server, wherein the method is applied to a data lake metadata server and comprises:
   receiving a metadata access request sent by a client, the metadata access request being used for obtaining metadata stored by a storage server for describing target data, the target data being data in a target table;
   determining a metadata service interface used by the data lake metadata server according to the metadata access request;
   obtaining, in response to the metadata service interface satisfying a preset condition, request parameters of the metadata access request, the request parameters including a number of table partitions and a number of partition levels of the target table;
   determining a number of applied tokens corresponding to the metadata access request according to the number of table partitions and the number of partition levels; and
   performing, in response to the number of applied tokens being greater than a number of remaining tokens corresponding to the client, limiting processing on the metadata access request,
   wherein obtaining the number of applied tokens corresponding to the metadata access request according to the number of table partitions and the number of partition levels comprises:
     obtaining a first value by calculating a logarithm of the number of table partitions;
     obtaining a second value by calculating a product of a first constant, the number of partition levels, and the first value;
     obtaining a third value by calculating a sum of the second value and a second constant; and
     calculating a product of the third value and a third constant as the number of applied tokens for the metadata access request, wherein the first constant, the second constant, and the third constant are related to a configuration of the storage server.

2. The method according to claim 1, further comprising:
   executing, in response to the number of applied tokens being less than or equal to the number of the remaining tokens corresponding to the client, the metadata access request;
   obtaining a number of actual table partitions returned after executing the metadata access request;
   obtaining a number of actually-used tokens for the metadata access request based on the number of table partitions and the number of partition levels in the request parameters, and the number of actual table partitions;
   calculating, in response to the number of the actually-used tokens is larger than the number of the applied tokens, a difference between the number of actually-used tokens and the number of applied tokens, and applying to a token server for a number of tokens equal to the difference.

3. The method according to claim 2, wherein obtaining the number of actually-used tokens for the metadata access request based on the number of table partitions and the number of partition levels in the request parameters, and the number of actual table partitions comprises:
   obtaining a fourth value by calculating a logarithm of the number of table partitions;
   obtaining a fifth value by calculating a logarithm of the number of actual table partitions;
   calculating a product of a fourth constant, the number of partition levels, the fourth value, and the fifth value as a number of actually-used tokens for the metadata access request, the fourth constant being related to a configuration of the storage server.

4. The method according to claim 1, wherein obtaining the request parameters of the metadata access request comprises:
obtaining, according to a table name of the target table, the number of table partitions and the number of partition levels of the target table from a memory of the data lake metadata server;
wherein the number of table partitions of the target table is stored in the storage server, and the number of table partitions of the target table is loaded into the memory of the data lake metadata server upon initiation of the data lake metadata server, the number of partition levels of the target table is loaded into the memory of the data lake metadata server according to a preset cycle.

5. The method according to claim 1, wherein the client has a maximum number of tokens correspondingly, the process of obtaining the maximum number of tokens corresponding to the client comprises:
determining an address of a corresponding data lake metadata server according to a library name of a library to which the target table belongs, and determining a number of storage servers corresponding to the data lake metadata server according to the address of the data lake metadata server;
calculating a maximum number of tokens corresponding to the client according to the number of the storage servers corresponding to the data lake metadata server and the number of tokens of a single one of the storage servers;
wherein the number of tokens of the single one storage server is related to the statistics of the number of tokens consumed by an online access request of the storage server per unit of time and a hardware utilization rate of the storage server.

6. The method according to claim 1, further comprising:
determining, in response to the metadata service interface not satisfying the preset condition, whether to perform limiting processing on the metadata access request according to a limiting rule of the metadata service interface.

7. An electronic device, comprising:
one or more processors;
a storage device having one or more programs stored thereon,
wherein the one or more programs when executed by the one or more processors, cause the one or more processors to:
receive a metadata access request sent by a client, the metadata access request being used for obtaining metadata stored by a storage server for describing target data, the target data being data in a target table;
determine a metadata service interface used by the data lake metadata server according to the metadata access request;
obtain, in response to the metadata service interface satisfying a preset condition, request parameters of the metadata access request, the request parameters including a number of table partitions and a number of partition levels of the target table; and
determine a number of applied tokens corresponding to the metadata access request according to the number of table partitions and the number of partition levels;
perform, in response to the number of applied tokens being greater than a number of remaining tokens corresponding to the client, limiting processing on the metadata access request,
wherein the one or more programs that cause the one or more processor to obtain the number of applied tokens corresponding to the metadata access request according to the number of table partitions and the number of partition levels further cause the one or more processors to:
obtain a first value by calculating a logarithm of the number of table partitions;
obtain a second value by calculating a product of a first constant, the number of partition levels, and the first value;
obtain a third value by calculating a sum of the second value and a second constant; and
calculate a product of the third value and a third constant as the number of applied tokens for the metadata access request, wherein the first constant, the second constant, and the third constant are related to a configuration of the storage server.

8. The electronic device according to claim 7, wherein the one or more programs further cause the one or more processors to:
execute, in response to the number of applied tokens being less than or equal to the number of the remaining tokens corresponding to the client, the metadata access request;
obtain a number of actual table partitions returned after executing the metadata access request;
obtain a number of actually-used tokens for the metadata access request based on the number of table partitions and the number of partition levels in the request parameters, and the number of actual table partitions;
calculate, in response to the number of the actually-used tokens is larger than the number of the applied tokens, a difference between the number of actually-used tokens and the number of applied tokens, and applying to a token server for a number of tokens equal to the difference.

9. The electronic device according to claim 8, wherein the one or more programs that cause the one or more processors to obtain the number of actually-used tokens for the metadata access request based on the number of table partitions and the number of partition levels in the request parameters, and the number of actual table partitions further cause the one or more processors to:
obtain a fourth value by calculating a logarithm of the number of table partitions;
obtain a fifth value by calculating a logarithm of the number of actual table partitions;
calculate a product of a fourth constant, the number of partition levels, the fourth value, and the fifth value as a number of actually-used tokens for the metadata access request, the fourth constant being related to a configuration of the storage server.

10. The electronic device according to claim 7, wherein the one or more programs that cause the one or more processors to obtain the request parameters of the metadata access request further cause the one or more processors to:
obtain, according to a table name of the target table, the number of table partitions and the number of partition levels of the target table from a memory of the data lake metadata server;
wherein the number of table partitions of the target table is stored in the storage server, and the number of table partitions of the target table is loaded into the memory of the data lake metadata server upon initiation of the data lake metadata server, the number of partition levels of the target table is loaded into the memory of the data lake metadata server according to a preset cycle.

11. The electronic device according to claim 7, wherein the client has a maximum number of tokens correspondingly, the one or more programs that cause the one or more processors to obtain the maximum number of tokens corresponding to the client further cause the one or more processors to:
  determine an address of a corresponding data lake metadata server according to a library name of a library to which the target table belongs, and determining a number of storage servers corresponding to the data lake metadata server according to the address of the data lake metadata server;
  calculate a maximum number of tokens corresponding to the client according to the number of the storage servers corresponding to the data lake metadata server and the number of tokens of a single one of the storage servers;
  wherein the number of tokens of the single one storage server is related to the statistics of the number of tokens consumed by an online access request of the storage server per unit of time and a hardware utilization rate of the storage server.

12. The electronic device according to claim 7, wherein the one or more programs further cause the one or more processors to:
  determine, in response to the metadata service interface not satisfying the preset condition, whether to perform limiting processing on the metadata access request according to a limiting rule of the metadata service interface.

13. A non-transitory computer-readable storage medium having a computer program stored thereon which, when executed by a processor, causes the processor to:
  receive a metadata access request sent by a client, the metadata access request being used for obtaining metadata stored by a storage server for describing target data, the target data being data in a target table;
  determine a metadata service interface used by the data lake metadata server according to the metadata access request;
  obtain, in response to the metadata service interface satisfying a preset condition, request parameters of the metadata access request, the request parameters including a number of table partitions and a number of partition levels of the target table;
  determine a number of applied tokens corresponding to the metadata access request according to the number of table partitions and the number of partition levels; and
  perform, in response to the number of applied tokens being greater than a number of remaining tokens corresponding to the client, limiting processing on the metadata access request,
  wherein the computer program that causes the processor to obtain the number of applied tokens corresponding to the metadata access request according to the number of table partitions and the number of partition levels further causes the processor to:
    obtain a first value by calculating a logarithm of the number of table partitions;
    obtain a second value by calculating a product of a first constant, the number of partition levels, and the first value;
    obtain a third value by calculating a sum of the second value and a second constant;
    calculate a product of the third value and a third constant as the number of applied tokens for the metadata access request, wherein the first constant, the second constant, and the third constant are related to a configuration of the storage server.

14. The non-transitory computer-readable storage medium according to claim 13, wherein the computer program further causes the processor to:
  execute, in response to the number of applied tokens being less than or equal to the number of the remaining tokens corresponding to the client, the metadata access request;
  obtain a number of actual table partitions returned after executing the metadata access request;
  obtain a number of actually-used tokens for the metadata access request based on the number of table partitions and the number of partition levels in the request parameters, and the number of actual table partitions;
  calculate, in response to the number of the actually-used tokens is larger than the number of the applied tokens, a difference between the number of actually-used tokens and the number of applied tokens, and applying to a token server for a number of tokens equal to the difference.

15. The non-transitory computer-readable storage medium according to claim 14, wherein the computer program that causes the processor to obtain the number of actually-used tokens for the metadata access request based on the number of table partitions and the number of partition levels in the request parameters, and the number of actual table partitions further causes the processor to:
  obtain a fourth value by calculating a logarithm of the number of table partitions;
  obtain a fifth value by calculating a logarithm of the number of actual table partitions;
  calculate a product of a fourth constant, the number of partition levels, the fourth value, and the fifth value as a number of actually-used tokens for the metadata access request, the fourth constant being related to a configuration of the storage server.

16. The non-transitory computer-readable storage medium according to claim 13, wherein the computer program that causes the one or more processor to obtain the request parameters of the metadata access request further causes the processor to:
  obtain, according to a table name of the target table, the number of table partitions and the number of partition levels of the target table from a memory of the data lake metadata server;
  wherein the number of table partitions of the target table is stored in the storage server, and the number of table partitions of the target table is loaded into the memory of the data lake metadata server upon initiation of the data lake metadata server, the number of partition levels of the target table is loaded into the memory of the data lake metadata server according to a preset cycle.

17. The non-transitory computer-readable storage medium according to claim 13, wherein the client has a maximum number of tokens correspondingly, the computer program that causes the one or more processor to obtain the maximum number of tokens corresponding to the client further causes the processor to:
  determine an address of a corresponding data lake metadata server according to a library name of a library to which the target table belongs, and determining a number of storage servers corresponding to the data lake metadata server according to the address of the data lake metadata server;

calculate a maximum number of tokens corresponding to the client according to the number of the storage servers corresponding to the data lake metadata server and the number of tokens of a single one of the storage servers;

wherein the number of tokens of the single one storage server is related to the statistics of the number of tokens consumed by an online access request of the storage server per unit of time and a hardware utilization rate of the storage server.

\* \* \* \* \*